(12) United States Patent
Walter et al.

(10) Patent No.: US 11,079,186 B2
(45) Date of Patent: Aug. 3, 2021

(54) HEAT EXCHANGER WITH SETS OF CHANNELS FORMING CHECKERED PATTERN

(71) Applicant: ALFA LAVAL CORPORATE AB, Lund (SE)

(72) Inventors: Kristian Walter, Genarp (SE); Klas Bertilsson, Eslöv (SE); Fredrik Strömer, Kävlinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 413 days.

(21) Appl. No.: 16/083,367

(22) PCT Filed: Mar. 28, 2017

(86) PCT No.: PCT/EP2017/057309
§ 371 (c)(1),
(2) Date: Sep. 7, 2018

(87) PCT Pub. No.: WO2017/167747
PCT Pub. Date: Oct. 5, 2017

(65) Prior Publication Data
US 2020/0300561 A1   Sep. 24, 2020

(30) Foreign Application Priority Data

Mar. 31, 2016 (EP) .................... 16163349

(51) Int. Cl.
*F28F 9/02* (2006.01)
*F28F 7/02* (2006.01)
(Continued)

(52) U.S. Cl.
CPC ................ *F28F 9/026* (2013.01); *F28F 7/02* (2013.01); *F28F 21/086* (2013.01);
(Continued)

(58) Field of Classification Search
CPC .. F28F 7/02; F28F 9/026; F28F 9/0263; F28F 9/0282; F28F 2255/16; F28F 2255/18;
(Continued)

(56) References Cited

U.S. PATENT DOCUMENTS 2,875,986 A * 3/1959 Holm .................... F28D 9/0068
165/145
3,363,680 A   1/1968 Baker
(Continued)

FOREIGN PATENT DOCUMENTS

CN   101568790 A   10/2009
DE      854363 C   11/1952
(Continued)

OTHER PUBLICATIONS

An English Translation of the Office Action (First Office Action) and Search Report dated Sep. 3, 2019, by the National Intellectual Property Administration, P. R. China in corresponding Chinese Patent Application No. 201780021314.1. (6 pages).
(Continued)

*Primary Examiner* — Jianying C Atkisson
*Assistant Examiner* — Jose O Class-Quinones
(74) *Attorney, Agent, or Firm* — Buchanan Ingersoll & Rooney PC

(57) ABSTRACT

A heat exchanger includes a central body with a first set of channels and a second set of channels extending along a main direction through the central body, wherein, in the central body, in any cross-section across the main direction, the channels of the first and second sets form a checkered pattern in said cross-sections, wherein the heat exchanger further includes two inner transition portions, wherein, in respective inner transition portion, among the rows extending along a first direction, are every second, counted along a second direction, row provided with channels being along
(Continued)

the main direction increasingly shifted in position in a first direction relative to the other channels such that the checkered pattern of channels is transformed into a line pattern.

20 Claims, 8 Drawing Sheets

(51) Int. Cl.
*F28F 21/08* (2006.01)
*B33Y 80/00* (2015.01)
*B23K 101/14* (2006.01)

(52) U.S. Cl.
CPC ........... *B23K 2101/14* (2018.08); *B33Y 80/00* (2014.12); *F28F 21/083* (2013.01); *F28F 2255/18* (2013.01)

(58) Field of Classification Search
CPC .... F28D 7/0008; F28D 7/0016; F28D 7/0025; F28D 7/0033; F28D 1/0246; F28D 21/0001; F28D 2021/0021
See application file for complete search history.

(56) References Cited

U.S. PATENT DOCUMENTS

| | | | |
|---|---|---|---|
| 3,926,251 A | | 12/1975 | Pei |
| 4,044,825 A | * | 8/1977 | Gugenberger ............ F28F 7/02 165/165 |
| 4,368,779 A | | 1/1983 | Rojey et al. |
| 4,421,702 A | * | 12/1983 | Oda .......................... F28F 7/02 264/209.8 |
| 4,601,332 A | * | 7/1986 | Oda .......................... F28F 7/02 165/165 |
| 4,609,039 A | * | 9/1986 | Fushiki ................. F28F 9/0221 96/126 |
| 4,733,718 A | | 3/1988 | Schikowsky et al. |
| 4,771,826 A | | 9/1988 | Grehier et al. |
| 4,898,233 A | | 2/1990 | Grehier et al. |
| 5,416,057 A | * | 5/1995 | Lipp ..................... F01N 3/2828 165/133 |
| 5,725,051 A | | 3/1998 | Veltkamp |
| 6,896,043 B2 | * | 5/2005 | Dunn .................... F28D 9/0062 165/165 |
| 7,285,153 B2 | | 10/2007 | Bruun et al. |
| 8,196,647 B2 | | 6/2012 | Bruun et al. |
| 2004/0258587 A1 | * | 12/2004 | Bowe ....................... B01J 23/40 422/222 |
| 2005/0217837 A1 | | 10/2005 | Kudija, Jr. |
| 2013/0206374 A1 | | 8/2013 | Roisin et al. |
| 2017/0146305 A1 | * | 5/2017 | Kuczek ................ F28F 9/0256 |
| 2017/0198977 A1 | * | 7/2017 | Herring ..................... F28F 9/02 |
| 2017/0198978 A1 | * | 7/2017 | Kuczek ................ F28D 7/0066 |
| 2017/0205146 A1 | * | 7/2017 | Turney ................. F28D 7/0033 |

FOREIGN PATENT DOCUMENTS

| | | |
|---|---|---|
| DE | 243088 A1 | 2/1987 |
| DE | 19512351 C1 | 11/1996 |
| EP | 2 131 133 A1 | 12/2009 |
| GB | 1 354 502 A | 6/1974 |
| JP | H08-075385 A | 3/1996 |
| JP | 2000-266480 A | 9/2000 |
| JP | 2008-249291 A | 10/2008 |
| JP | 2015-140960 A | 8/2015 |
| WO | 9410520 A1 | 5/1994 |
| WO | 2008/058376 A1 | 5/2008 |
| WO | 2013163398 A1 | 10/2013 |

OTHER PUBLICATIONS

Office Action (Decision of Rejection) dated Feb. 17, 2020, by the Japanese Patent Office in corresponding Japanese Patent Application No. 2018-551188 and an English Translation of the Office Action. (9 pages).

International Search Report (PCT/ISA/210) dated Jun. 7, 2017, by the European Patent Office as the International Searching Authority for International Application No. PCT/EP2017/057309.

Written Opinion (PCT/ISA/237) dated Jun. 7, 2017, by the European Patent Office as the International Searching Authority for International Application No. PCT/EP2017/057309.

Office Action (Notice of Reasons for Rejection) dated Oct. 28, 2019, by the Japanese Patent Office in corresponding Japanese Patent Application No. 2018-551188 and an English Translation of the Office Action. (7 pages).

* cited by examiner

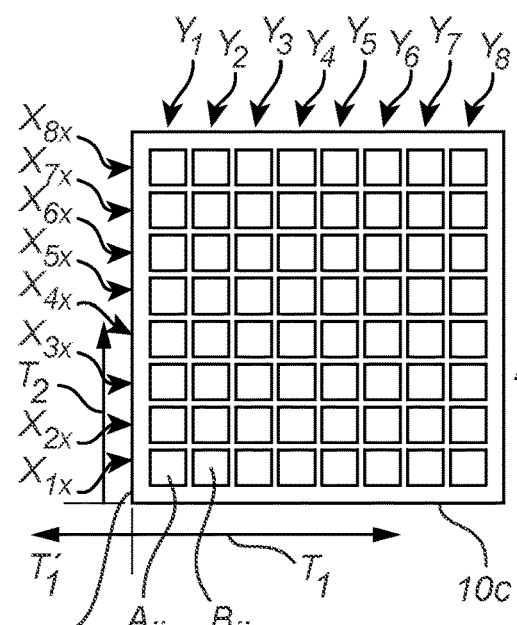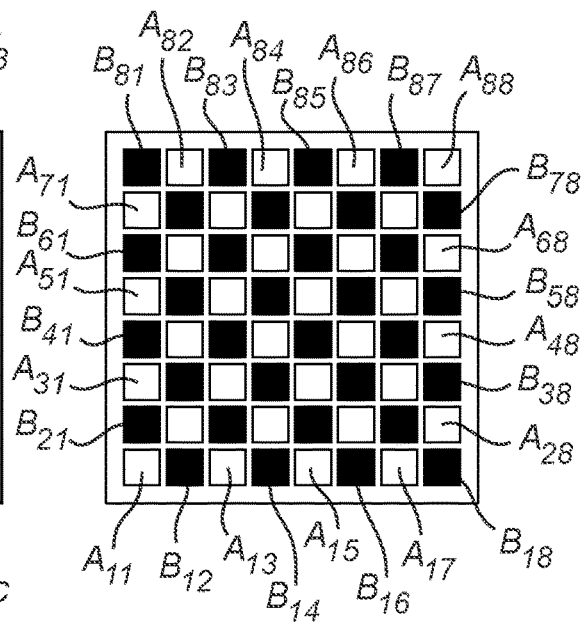
Fig. 3a  Fig. 3b
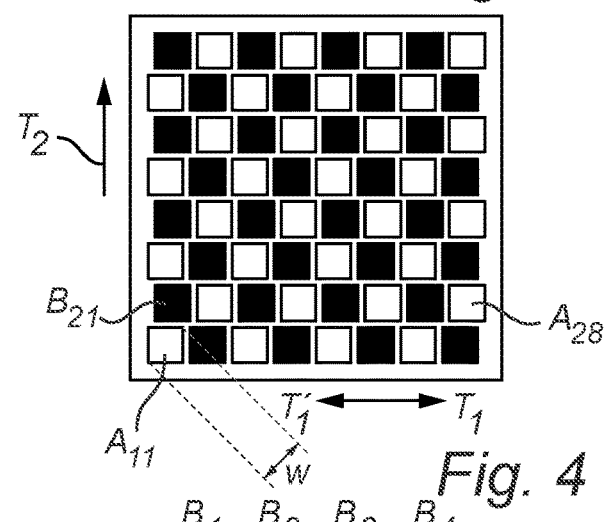
Fig. 4
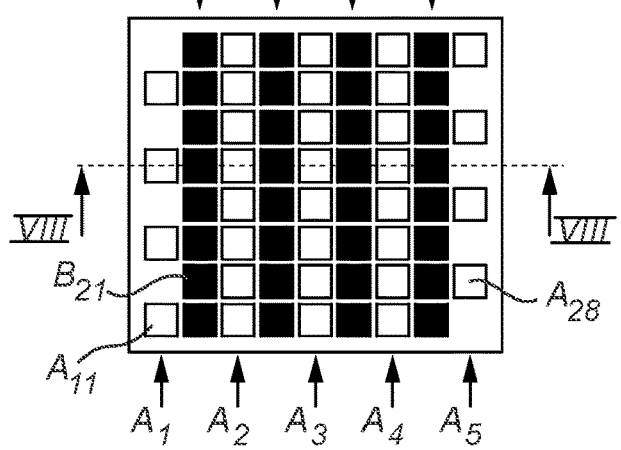
Fig. 5

HEAT EXCHANGER WITH SETS OF CHANNELS FORMING CHECKERED PATTERN

TECHNICAL FIELD

The invention relates to a heat exchanger comprising an integrally formed central body with a first set of channels forming part of a first set of fluid pathways through the heat exchanger, and a second set of channels forming part of a second set of fluid pathways through the heat exchanger, wherein the channels of the first and second sets of a plurality of channels extend from a first end of the central body, along a main direction through the central body, to a second end of the central body, wherein, in the central body, in any cross-section across the main direction, the channels of the first and second sets form a checkered pattern in said cross-sections by being arranged alternatingly in a plurality of rows along a first direction extending along a first portion of a perimeter of the pattern and alternatingly in a plurality of rows along a second direction extending, transverse to the first direction, along a second portion of the perimeter of the pattern.

BACKGROUND

When designing heat exchangers, there are a number of issues that typically need to be taken into account. It is typically desirable to have the surface areas of the walls between the two fluids to be as large as possible in order to maximize the thermal contact between the relatively hot and cold fluids. It is also typically desirable to minimize flow resistance or pressure losses or at least to avoid undue flow resistance or pressure losses. It is typically also desirable to keep the size of the heat exchangers as small as possible. It is typically also desirable to keep the weight, cost and/or amount of material used in the heat exchanges at a minimum. Sometimes the solution to one issue is also beneficial with respect to one or more other issues and sometimes the solutions are contradictory and the solutions to the respective issues need to be balanced.

U.S. Pat. No. 7,285,153 B2 discloses a method and equipment for feeding two gases into and out of a multi-channel monolithic structure. There is disclosed a number of different configurations for the arrangements of the channels for the two gases. In order to be able to distribute the gases into the plurality of channels in the different arrangements, there is also disclosed different set-ups where the heat exchanger is provided with a plurality of plates having different hole patterns thereby joining together different channels step by step until they have been transformed into a single outlet or inlet.

U.S. Pat. No. 8,196,647 B2 also discloses a method and equipment for feeding two gases into and out of a multi-channel monolithic structure. In order to be able to distribute the gases into the plurality of channels of the monoliths, there is disclosed different set-ups where the heat exchanger is provided with a plurality of plates having different hole patterns thereby joining together different channels step by step until they have been transformed into a single outlet or inlet.

In WO2013/163398 discloses a heat exchange tube, a heat exchanger using such a tube and a method of making such a tube. Additive manufacturing is used to form at least a portion of the tube. Augmented heat exchange features, such as external and internal lattice structure is built up along the tube to form enhanced heat exchange regions with intermittent repeating shapes. Those lattice shapes are said to maximise heat-dissipating surface of the tube while reducing or eliminating large external dimensions associated with traditional tube manufacture.

DE 195 12 351 C1 discloses a system where a plurality of heat storing multi-channel blocks is rotated to alternately be present in cold and hot air streams to thereby transfer heat between the two air streams.

SUMMARY

It is an object of the invention to provide an improved heat exchanger. It is an object of the invention to provide a heat exchanger in which it is possible to provide an efficient heat transfer and keeping pressure losses or flow resistance at a minimum.

These objects have been achieved by a heat exchanger comprising a central body, preferably an integrally formed central body, with a first set of channels forming part of a first set of fluid pathways through the heat exchanger, and a second set of channels forming part of a second set of fluid pathways through the heat exchanger, wherein the channels extend from a first end of the central body, along a main direction through the central body, to a second end of the central body, wherein, in the central body, in a, preferably in any and every, cross-section across the main direction, the channels of the first and second sets form a checkered pattern by being arranged alternatingly in a plurality of rows along a first direction extending along a first portion of the pattern and alternatingly in a plurality of rows along a second direction extending, transverse to, or at least essentially transverse to, the first direction and along a second portion of the pattern, the heat exchanger further comprising two inner transition portions of which one extends from the first end of the central body and one extends from the second end of the central body, the channels of the central body extending from the ends of the central body, in the checkered pattern and into each of the inner transition portions at an inner end of respective inner transition portion through respective inner transition portion, preferably with respective channel having an extension substantially parallel with or at least with a major component along the main direction, to an outer end of respective inner transition portion, wherein, in respective inner transition portion, among the rows extending along the first direction, are every second, counted along a second direction, row provided with channels being, in a plurality of cross-sections, across the main direction, sequentially following each other along the main direction, increasingly shifted in position in a first direction, a shift direction, relative to the other channels of respective inner transition portion, whereby the checkered pattern of the first and the second sets of channels at the inner end of respective inner transition portion is transformed into a line pattern at the outer end of respective inner transition portion, the channels of the respective set of channels thereby, at the outer end, being arranged alongside each other in rows that extend along the second direction, with the rows of the first set channels and the rows of the second set channels being arranged alternatingly along the first direction.

By designing the central body with the channels associated with the different pathways forming a checkered pattern, the walls between the channels will as much as possible have channels associated with different pathways at opposite sides of the wall. Thereby, there will be an efficient heat transfer and the cross-section of the central body may be small compared to the available heat transfer area provided by the walls between the channels associated with the different pathways.

It may be noted that the main direction, which also may be referred to as a longitudinal direction, is preferably but need not form a straight line. The central body may be curved, e.g. curved into a U-shape. It may also be noted that the checkered pattern is preferably but need not have the same orientation throughout the central body. The central body may be twisted along the main direction such that the checkered pattern changes orientation along the main direction. The main direction may be defined as the direction the channels take from the first end of the central body, through the central body and to the second end of the central body. By providing the inner transition portion in which every channel of every second row is increasingly shifted such that said every second row is shifted in a shift direction into a line pattern, it is possible to change the checkered pattern into a line pattern while keeping pressure losses or flow resistance at a minimum. This increasing shifting may be ever increasing shifting. The shifting may e.g. be provided with a straight channel being angled. The shifting may be provided with a curved channel. The shifting may be provided with a curved channel portion transitioning into a straight portion.

It may be noted that the shift direction of the first inner transition portion may be parallel with or may be transverse to the shift direction of the second inner transition portion.

It may be noted that checkered does not necessarily refer to a design in which the channels must be quadratic or rectangular and not necessarily refer to a design where the first and second directions are straight lines being rectilinearly arranged relative to each other. Other shapes of the channels are conceived. It is also conceivable to have a skewed relationship between the first and second directions and/or non-straight, such as curved, perimeter lines. Checkered is intended to refer to the alternatingly arrangement in two directions. Similarly, the line pattern is not limited to straight lines of quadratic channels. The line pattern refers to the alternatingly arrangement in one direction.

Preferred embodiments appear in the dependent claims and in the description.

As mentioned above, the central body is preferably an integrally formed central body. In the uniform body, wall sections of uniform integral material form walls for a plurality of channels in both the first and the second direction. The integrally formed central body having a plurality of channels extending through the body. The integrally formed central body may e.g. be formed by extrusion or by additive depositing of a material, such as a polymer material or a metal material. It may be noted that the central body may as an alternative be an assembly of more than one such integrally formed bodies; in the main direction and/or in one or more of the first and second direction.

In respective inner transition portion, among the rows extending along the first direction, may every other second, counted along a second direction, row be provided with channels being, in a plurality of cross-sections, across the main direction, sequentially following each other along the main direction, increasingly shifted in position in a direction opposite the first direction. Thereby the relative shifting of the every second rows may be performed along a short distance along the main direction and still minimising pressure losses or flow resistance.

The inner transition portions may be integrally formed with the central body. Thereby the risk of incorrect assembly of these parts and problems related thereto are eliminated. Moreover, since there is no need for any clamping system and since there is no need for any adaptation of the design to allow for soldering or welding, the heat exchanger may be designed in a compact manner with a strong focus on heat transfer and minimization of pressure losses or flow resistance.

The heat exchanger may further comprise two outer transition portions, one extending from either outer end of respective inner transition portion, wherein each outer transition portion comprises a first set of channels forming part of the first set of fluid pathways and a second set of channels forming part of the second set of fluid pathways, wherein the channels of the first and second set extend from an inner end of the outer transition portion, facing the inner transition portion, through the outer transition portion and out of the outer transition portion, wherein, in the outer transition portions, the first set of channels and/or the second set of channels are diverted to extend along a third direction respectively a fourth direction extending in parallel with a diversion plane defined by the main direction and the second direction and being transverse to said shift direction of respective inner transition portion, wherein the third and fourth directions are different from each other such that the first set of channels extend out of the outer transition portion at a first end portion and the second set of channels extend out of the outer transition portion at a second end portion, the second end portion being separated from the first end portion. With a design based on this principle it is possible to divide the first pathway from the second pathway in a compact manner and still minimizing the pressure losses or flow resistance.

Respective inner transition portion may be integrally formed with the associated outer transition portion. According to one embodiment the inner and outer transition portions are integrally formed and are attached to the central body. Thereby the risk of incorrect assembly of these parts and problems related thereto are eliminated. Moreover, since there is no need for any clamping system and since there is no need for any adaptation of the design to allow for soldering or welding, the heat exchanger may be designed in a compact manner with a strong focus on heat transfer and minimization of pressure losses or flow resistance.

Preferably the central body, the inner transition portions and the outer transition portions are integrally formed into a single body. Thereby the risk of incorrect assembly of these parts and problems related thereto are eliminated. Moreover, since there is no need for any clamping system and since there is no need for any adaptation of the design to allow for soldering or welding, the heat exchanger may be design in a compact manner with a strong focus on heat transfer and minimization of pressure losses or flow resistance.

The heat exchanger may further comprise four tubular connection portions, each having a tubular wall portion integrally formed with and extending from an outer envelope surface of respective one of the first and second end portions of respective outer transition portions. Preferably, the tubular connection portions are circular and more preferably they are provided with threaded outer surfaces allowing a connecting pipe to be threaded onto or to be held tight against the tubular connection portion using the threads. The tubular connection portions may alternatively be provided with internal threads. The tubular connection portions may be provided with other means of connecting tubular bodies together, such as a bayonet connection. By forming the connection portions integrally with the envelope surface of the end portions there is no need for any clamping system and since there is no need for any adaptation of the design to allow for soldering or welding, the heat exchanger may be design in a compact manner with a strong focus on heat transfer and minimization of pressure losses or flow resistance.

The inner transition portion may have a length in the main direction being at least 3 times a maximum width of any channel of the checkered pattern in the central body. With this ratio between the width of the channel and the length over which the channels of every second are shifted in the shift direction may be shifted in a gentle curvature, thereby minimizing the pressure losses or flow resistance.

Each channel in the central body may have a maximum width of less than 3 mm, preferably less than 2 mm. This way it is possible to design the central body with thin walls thereby achieving an efficient heat transfer and a lightweight and compact heat exchanger which still is able to withstand comparably high pressures.

Each channel in the body continuing through the inner transition portion and continuing into the outer transition portion may continue through the outer transition portion as a separate channel to respective first or second end portion. This way the channel walls will continue to strengthen each other throughout the complete extension of the channels.

In the outer transition portion, the channels of the first set of channels and/or the second set of channels being diverted to extend along a third direction respectively a fourth direction may be curved from the direction from which they exit the respective inner portion to the third respectively the fourth direction. This way the diversion may be provided with minimum pressure losses or flow resistance.

The central body and the inner transition portion may be formed by, preferably integrally formed by, additive depositing of a material forming the central body and the inner transition portion. This method allows for efficient manufacturing of complex shapes and thereby the e.g. the design may be chosen to minimise pressure losses or flow resistance.

The central body, the inner transition portion and the outer transition portion may be formed by, preferably integrally formed by, additive depositing of a material forming the central body, the inner transition portion and the outer transition portion. This method allows for efficient manufacturing of complex shapes and thereby the e.g. the design may be chosen to minimise pressure losses or flow resistance.

The material may be a metallic material, preferably chosen from the group consisting of titanium or titanium based alloys, tantalum or tantalum based alloys, steel or steel based alloys, stainless steel or stainless steel based alloys. By choosing these materials, it is possible to provide a corrosion resistant heat exchanger. Moreover, the materials are suitable to use in additive depositing manufacturing methods.

The material may be laser or electron sintered during the additive depositing of the metallic material, or sintered in an oven after the additive depositing. This way the material is fused into a strong product.

Each of the channels of the first set of channels has a first cross-sectional area and each of the channels of the second set of channels has a second cross-sectional area, wherein the first cross-sectional area may be between 1.1-1.5 times, preferably between 1.1-1.25 times, the second cross-sectional area. This way it is possible to accommodate different flows of the different fluids through the heat exchanger.

According to one aspect, the heat exchanger may in short be summarized as comprising a central body with a first set of a plurality of channels and a second set of a plurality of channels extending along a main direction through the central body, wherein, in the central body, in any cross-section across the main direction, the channels of the first and second sets form a checkered pattern in said cross-sections, wherein the heat exchanger further comprises two inner transition portions, wherein, in respective inner transition portion, among the rows extending along a first direction, are every second, counted along a second direction, row provided with channels being curved such that they are along the main direction increasingly shifted in position in a first direction relative to the other channels such that the checkered pattern of channels is transformed into a line pattern.

BRIEF DESCRIPTION OF THE DRAWINGS

The invention will by way of example be described in more detail with reference to the appended schematic drawings, which shows a presently preferred embodiment of the invention.

FIG. 3a is a schematic drawing corresponding to a cross-sectional view along line III-III in FIG. 2.

FIG. 3b is a schematic drawing corresponding to a cross-sectional view along line III-III in FIG. 2 in which the channels associated with one of the fluids is marked with dark solid marking.

FIG. 4 is a schematic drawing corresponding to a cross-sectional view along line IV-IV in FIG. 2 in which the channels associated with one of the fluids is marked with dark solid marking as in FIG. 3b.

FIG. 5 is a schematic drawing corresponding to a cross-sectional view along line V-V in FIG. 2 in which the channels associated with one of the fluids is marked with dark solid marking as in FIG. 3b and FIG. 4.

DETAILED DESCRIPTION

Figure 1:
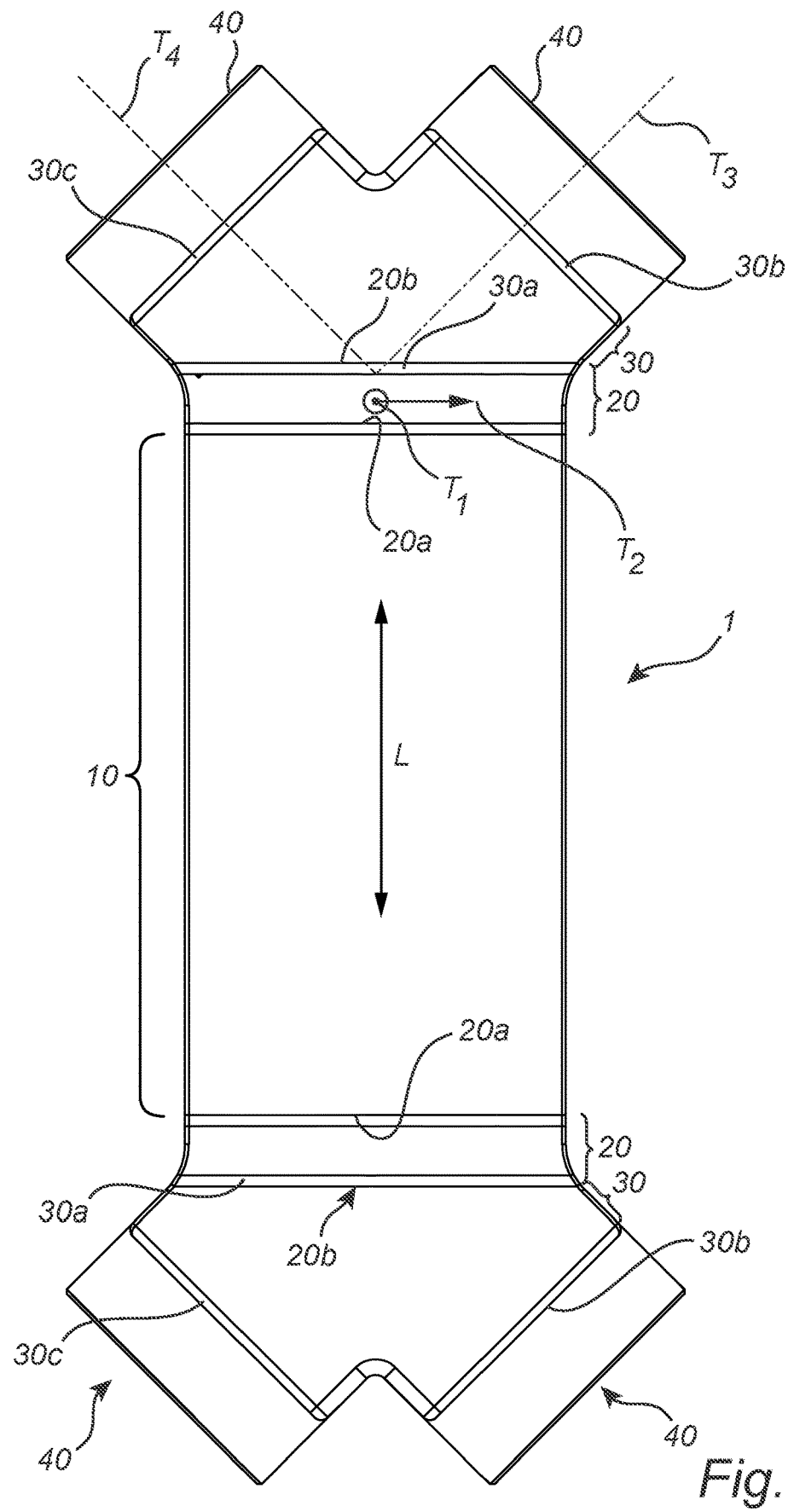
FIG. 1 is a first plan projection of a heat exchanger.

As shown in FIG. 1, the heat exchanger 1 comprises an integrally formed part comprising a central body 10, two inner transition portions 20, two outer transition portions 30, and four tubular connection portions 40.

Figure 6:
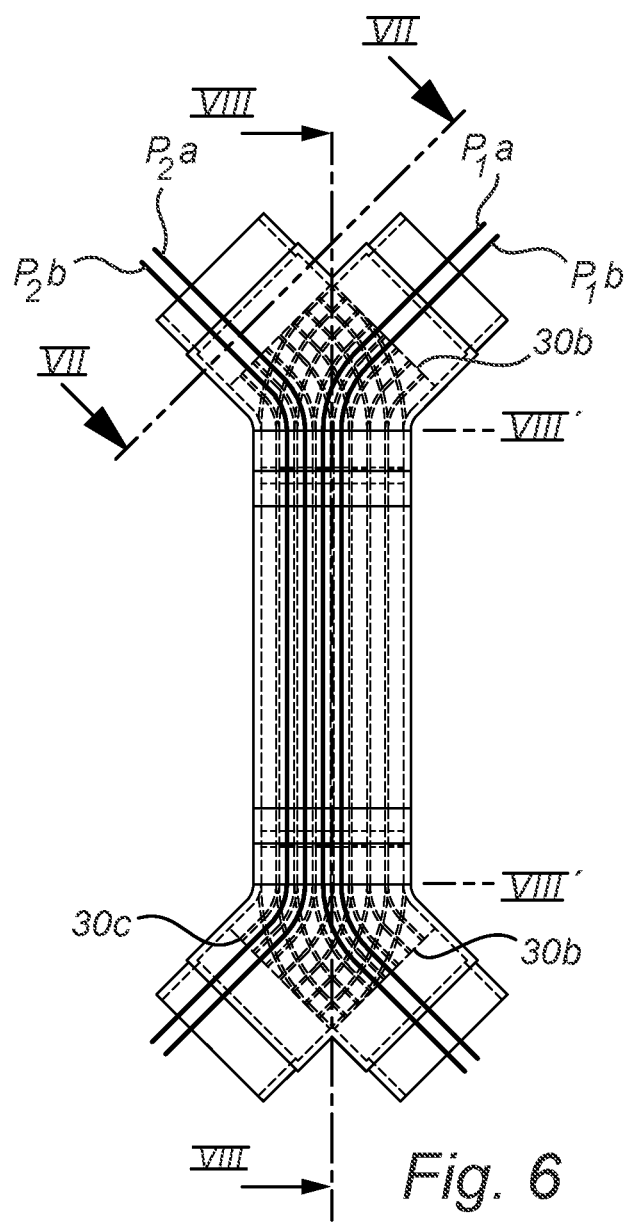
FIG. 6 is a schematic drawing, corresponding to FIG. 1, showing in dashed lines schematically the interior structure of the heat exchanger.

As shown in FIG. 3a and FIG. 3b the central body 10 comprises a first set of a plurality of channels $A_{ij}$. These channels $A_{ij}$ form part of a first set of fluid pathways $P_1a, P_1b$ (as indicated in FIG. 6 and collectively referred to as $P_1$) through the heat exchanger 10.

The central body 10 further comprises a second set of a plurality of channels $B_{ij}$. These channels $B_{ij}$ form part of a second set of fluid pathways $P_2a$, $P_2b$ (as indicated in FIG. 6 and collectively referred to as $P_2$) through the heat exchanger 10.

The channels $A_{ij}$, $B_{ij}$ of the first and second sets of a plurality of channels extend from a first end 10a of the central body 10, along a main direction L through the central body 10, to a second end 10b of the central body 10.

As shown in FIG. 3b in any cross-section across the main direction L, the channels $A_{ij}$, $B_{ij}$ of the first and second sets form a checkered pattern in said cross-sections. The checkered pattern is formed by the channels $A_{ij}$, $B_{ij}$ of the different sets being arranged alternatingly in a plurality of rows $X_{1X}$, $X_{2X}$, $X_{3X}$, $X_{4X}$, $X_{5X}$, $X_{6X}$, $X_{7X}$, $X_{8X}$ along a first direction $T_1$ extending along a first portion 10c of the pattern and alternatingly in a plurality of rows $Y_1$, $Y_2$, $Y_3$, $Y_4$, $Y_5$, $Y_6$, $Y_7$, $Y_8$ along a second direction $T_2$ extending along a second portion 10d of the pattern. The second direction $T_2$ is transverse to the first direction $T_1$.

The first row along the first direction $T_1$ comprises the channels $A_{11}$, $B_{12}$, $A_{13}$, $B_{14}$, $A_{15}$, $B_{16}$, $A_{17}$, $B_{18}$. The second row along the first direction $T_1$ comprises the channels $B_{21}$, $A_{22}$, $B_{23}$, $A_{24}$, $B_{25}$, $A_{26}$, $B_{27}$, $A_{28}$. The first row along the second direction comprises the channels $A_{11}$, $B_{21}$, $A_{31}$, $B_{41}$, $A_{51}$, $B_{61}$, $A_{71}$, $B_{81}$.

Figure 2:
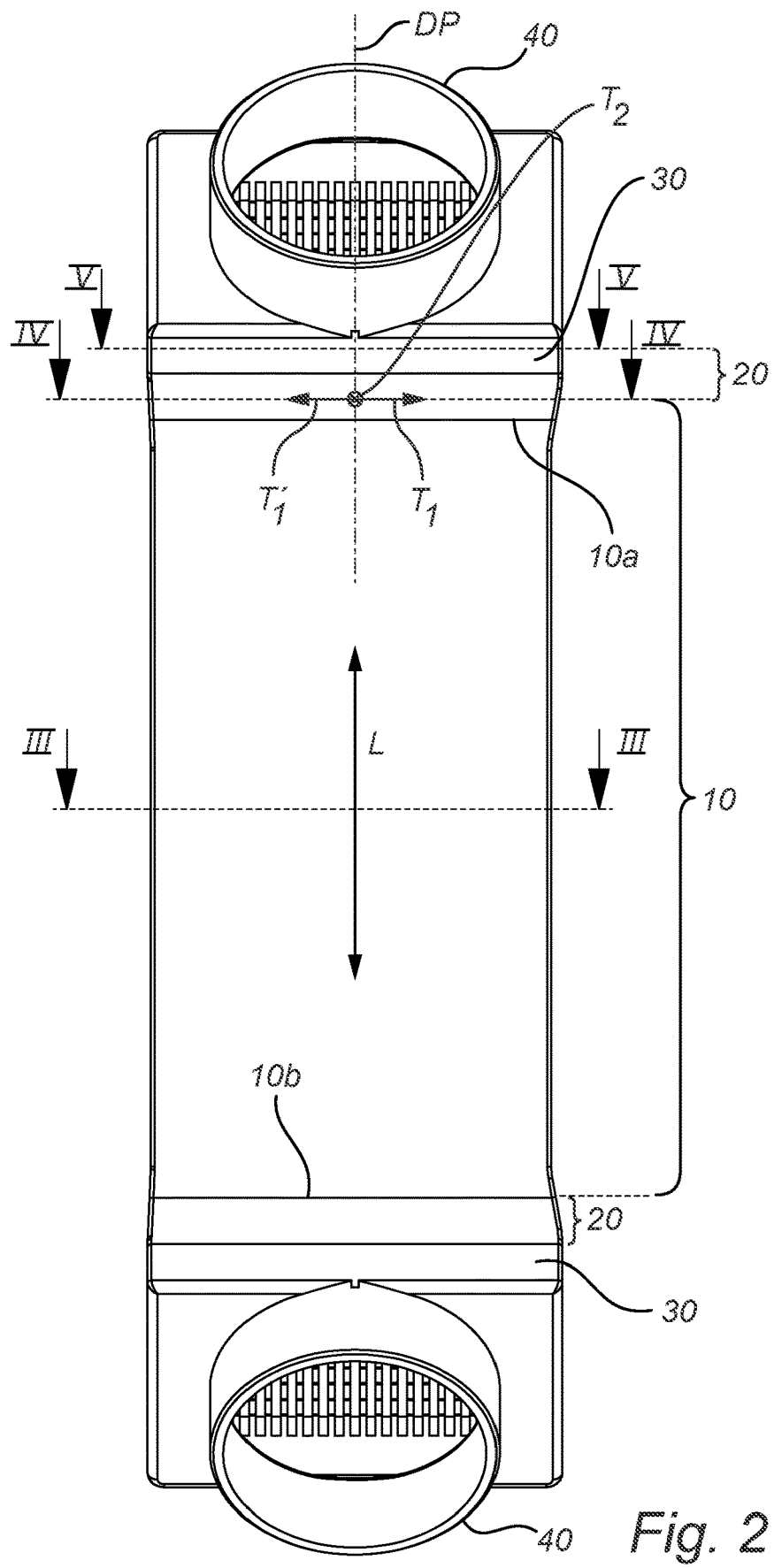
FIG. 2 is a second plan projection of the heat exchanger of FIG. 1.

It should in this context be noted that the number of channels is in practice often significantly greater than the number of channels indicated in FIGS. 3-9. In FIG. 2, there is indicated a greater number of channels. The sizes and numbers of channels will be discussed in detail later in the description.

The heat exchanger 1 further comprises two inner transition portions 20, one extending from the first end 10a of the central body 10 and the other extending from the second end 10b of the central body 10.

Each inner transition portion comprises a first set $A_{ij}$ of a plurality of channels forming part of the first set of fluid pathways $P_1$ and a second set of a plurality of channels $B_{ij}$ forming part of the second set of fluid pathways $P_2$. The channels $A_{ij}$, $B_{ij}$ of the first and second sets extend from an inner end 20a of respective inner transition portion 20, through respective inner transition portion 20, to an outer end 20b of respective inner transition portion 20.

The channels $A_{ij}$, $B_{ij}$ extend essentially in parallel with and at least with a major component along the main direction L in the respective inner transition portion 20. The inner transition portion 20 is oriented such that the inner end 20a is facing the central body 10.

In respective inner transition portion 20, among the rows extending along the first direction $T_1$, are every second, counted along a second direction $T_2$ shifted in position in the first direction $T_1$. This shifting of every second row is provided by every channel in the shifted rows are curved along their extension along the main direction L. It is sufficient that every channel of every second channel are shifted. This would e.g. be that the channels in rows 2, 4, 6, and 8 would be shifted along the first direction $T_1$. Row 1 is the one with $A_{11}$, $B_{12}$, etc and row 2 is the one with $B_{21}$, $A_{22}$, etc. Thus, in one example, the channels $X_{2X}$, $X_{4X}$, $X_{6X}$, $X_{8X}$ are shifted along the first direction $T_1$.

In the preferred embodiment are every channel $X_{2X}$, $X_{4X}$, $X_{6X}$, $X_{8X}$ of every second row along the second direction $T_2$ curved along the first direction and every channel $X_{1X}$, $X_{3X}$, $X_{6X}$, $X_{7X}$ of the other every second row curved along a direction $T_1'$ opposite the first direction $T_1$.

The reference numeral X denotes both A and B. The sub-script x denotes all the sub-scripts 1-8. That is $X_{2X}$ refers to $B_{21}$, $A_{22}$, $B_{23}$, $A_{24}$, $B_{25}$, $A_{26}$, $B_{27}$, $A_{28}$.

Figure 8:
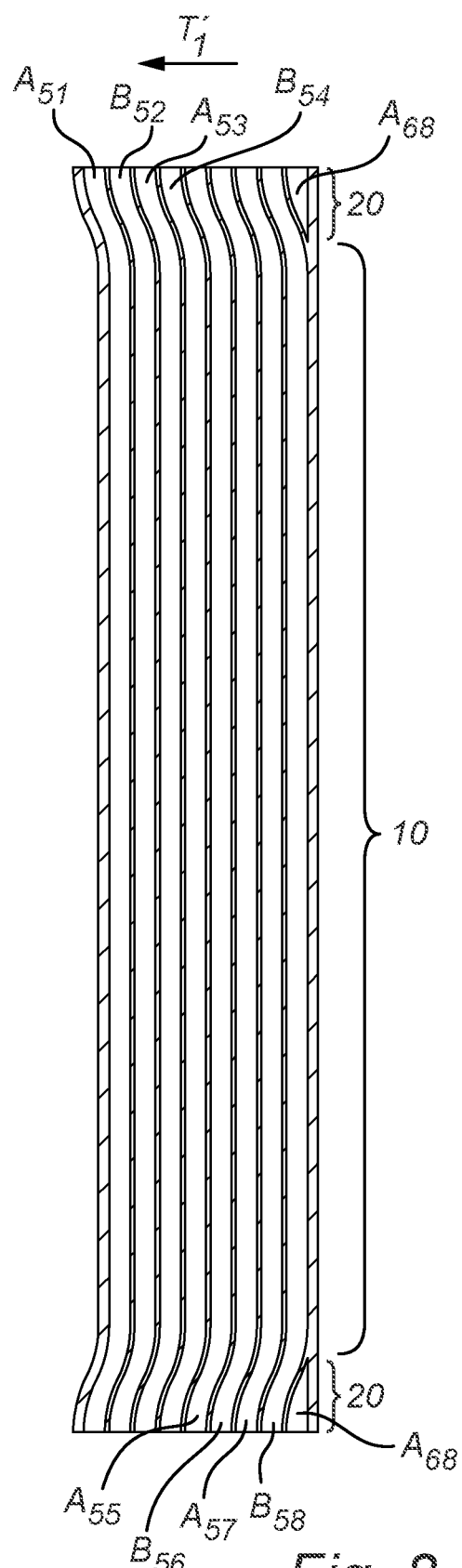
FIG. 8 is a cross-sectional view along line VIII-VIII in FIG. 6 of the portion between lines marked with VIII' and with the cross-section positioned as further indicated in FIG. 5.

The channels $X_{2X}$, $X_{4X}$, $X_{6X}$, $X_{8X}$ of every second row counted along the second direction $T_2$ are curved such that they are, in a plurality of cross-sections (see e.g. the sequence of FIG. 3b, FIG. 4 and FIG. 5), across the main direction L, sequentially following each other along the main direction L, increasingly shifted in position in a first direction $T_1$, a shift direction, relative to the other channels $X_{1X}$, $X_{3X}$, $X_{6X}$, $X_{7X}$ of respective inner transition portion 20. In FIG. 8 there is shown a cross-section showing how the channels $X_{1X}$, $X_{3X}$, $X_{6X}$, $X_{7X}$ extend straight through the central body 10 and are curved to provide a shift in a direction $T_1'$ opposite the first direction $T_1$. The in cross-section of FIG. 8, the channels of the fifth row counted along the second direction $T_2$ are shifted in the direction $T_1'$ being opposite to the first direction $T_1$. At the top and bottom the sidewall behind which the channel $A_{68}$ extends appears as the channels $X_{6X}$ approaches the outer end 20b of the respective inner transition portion 20.

The shape of the channels $A_{ij}$, $B_{ij}$ is such that the checkered pattern of channels at the inner end 20a (FIG. 3b) of respective inner transition portion 20 is transformed into a line pattern (FIG. 5) at the outer end 20b with the channels of respective set ($A_{ij}$ respectively $B_{ij}$) arranged alongside each other in rows A1-5, B1-4 extending along the second direction $T_2$ and with rows of first set channels and rows of second set channels being arranged alternatingly along the first direction $T_1$ of respective inner transition portion 20. It may be noted that the number of rows counted along the first direction $T_1$ have increased by one. Counted along the second direction $T_2$ is the number of rows the same as in the central body 10.

As mentioned above, the heat exchanger 1 further comprises two outer transition portions 30, one extending from either outer end 20b of respective inner transition portion 20.

Each outer transition portion comprises a first set of a plurality of channels $A_{ij}$ forming part of the first set of fluid pathways $P_1$ and a second set of a plurality of channels $B_{ij}$ forming part of the second set of fluid pathways $P_2$.

The channels $A_{ij}$, $B_{ij}$ of the first and second set extend from an inner end 30a of the outer transition portion 30, facing the inner transition portion 20, through the outer transition portion 30 and out of the outer transition portion 30.

Figure 10:
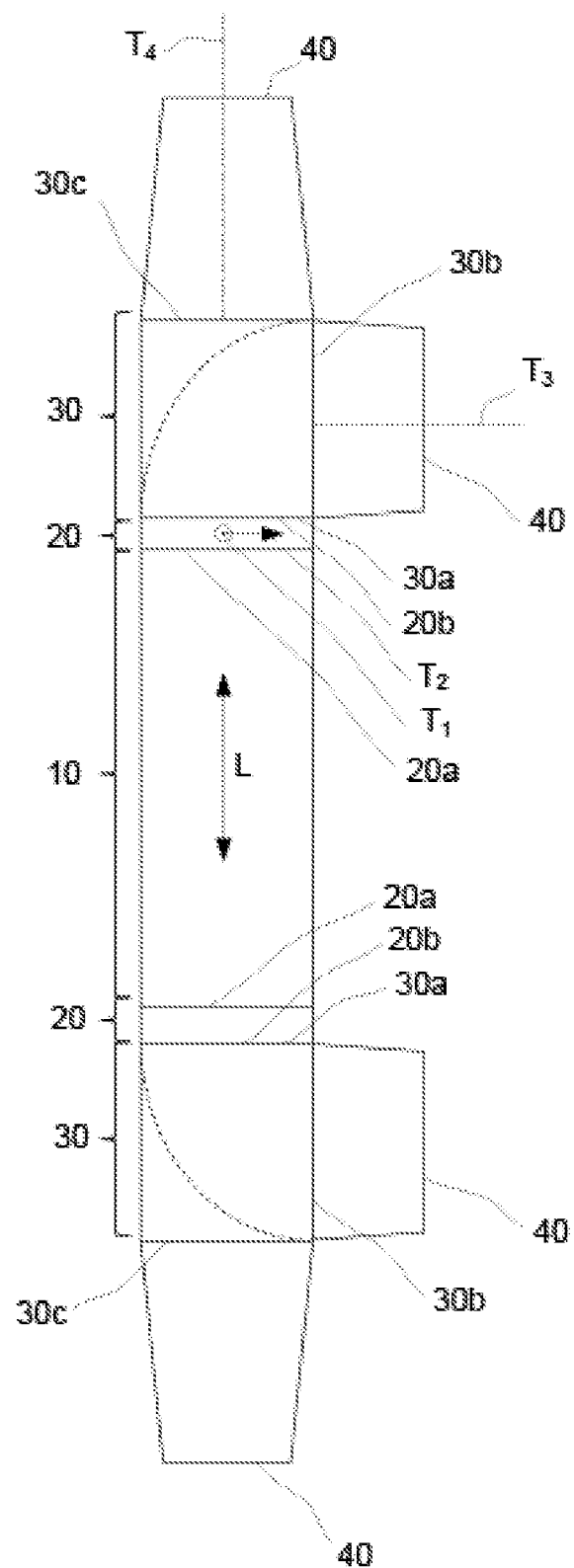
FIGS. 10 and 11 are plan projections of alternative embodiments of a heat exchanger where the channels associated with different fluids extend in different directions at end portions of an outer transition portion.
Figure 11:
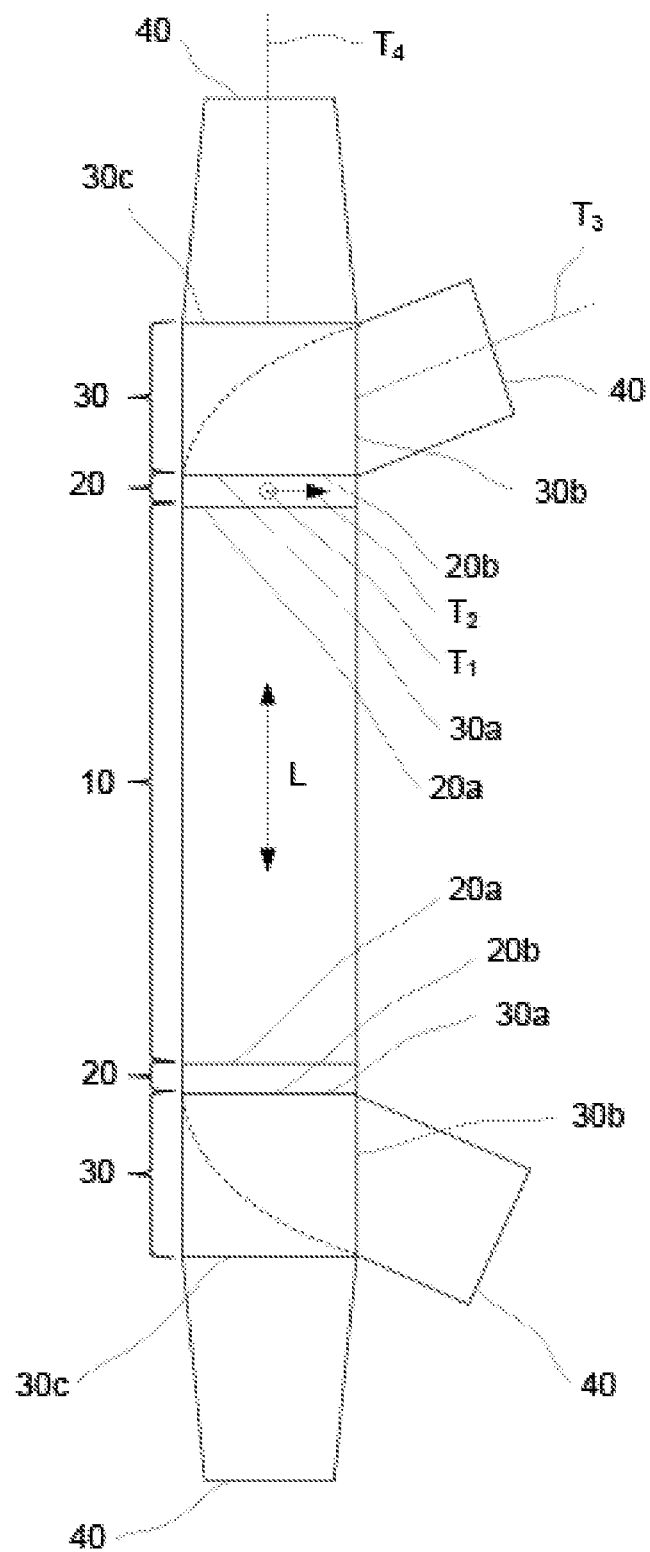

In the outer transition portions 30, the first set of channels A1-5 and/or the second set of channels B1-4 are diverted to extend along a third direction $T_3$ respectively a fourth direction $T_4$ extending in parallel with a diversion plane DP defined by the main direction L and the second direction $T_2$ and being transverse to said shift direction of respective inner transition portion 20. The diversion plane DP is shown in FIG. 2 and is parallel with the plane of the paper of FIG. 1, FIG. 6 and FIGS. 10-11. The shift direction of respective inner transition portion 20 extends along the normal of the diversion plane DP of respective outer transition portion 30. In the embodiment in FIGS. 1 and 6, in the outer transition portions 30, the first set of channels $A_{ij}$ is diverted to extend along a third direction $T_3$ and the second set of channels $B_{ij}$ is diverted to extend along a fourth direction $T_4$. In the embodiments shown in FIGS. 10 and 11, in the outer transition portions 30, the first set of channels $A_{ij}$ is diverted to extend along a third direction $T_3$, while the second set of channels $B_{ij}$ is undiverted. In the embodiments of FIGS. 10 and 11 the second set of channels $B_{ij}$ extend out of the second end portion 30c of the outer transition portion 30 along a fourth direction $T_4$ that is parallel to the main direction L.

As shown in FIGS. 1, 6 and 10-11, the third and fourth directions $T_3$, $T_4$ are different from each other such that the first set of channels $A_{ij}$ extend out of the outer transition portion 30 at a first end portion 30b and the second set of channels $B_{ij}$ extend out of the outer transition portion 30 at a second end portion 30c. The second end portion 30c is separated from the first end portion 30b. In the embodiment in FIGS. 1 and 6 both the third direction $T_3$ and the fourth direction $T_4$ are different from the direction from which the channels exit the respective inner transition portion 20, i.e. both the third direction $T_3$ and the fourth direction $T_4$ are different from the main direction L. As shown in FIGS. 1 and 6, both the third direction $T_3$ and the fourth direction $T_4$ form an angle in relation to the main direction L of about 45°, such that the third direction $T_3$ and the fourth direction $T_4$ are perpendicular to each other, i.e. form an angle of about 90° between themselves. In the embodiments of FIGS. 10 and 11, the third direction $T_3$ is different from the direction from which the channels exit the inner transition portion 20, while the fourth direction $T_4$ is the same direction from which the channels exit the inner transition portion 20, i.e. the third direction $T_3$ is different from the main direction L, while the fourth direction $T_4$ is the same direction as the main direction L. In FIG. 10, the third direction $T_3$ form an angle in relation to the main direction L of about 90°, such that the third direction $T_3$ and the fourth direction $T_4$ are perpendicular to each other, i.e. form an angle of about 90° between themselves. In FIG. 11, the third direction $T_3$ form an angle in relation to the main direction L of about 70°, such that the third direction $T_3$ and the fourth direction $T_4$ form an angle of about 70° between themselves. The angle between the third direction $T_3$ and the fourth direction $T_4$ is preferably be at least 30° to achieve a separation of the third and fourth directions $T_3$, $T_4$ during a reasonable long transition path, i.e. to keep the dimensions of the outer transition portion down. Preferably the angle between the third direction $T_3$ and the fourth direction $T_4$ is at least 45°, such as at least 60°, such as at least 70°, such as about 90°, to further reduce the size of the outer transition portion.

Figure 7:
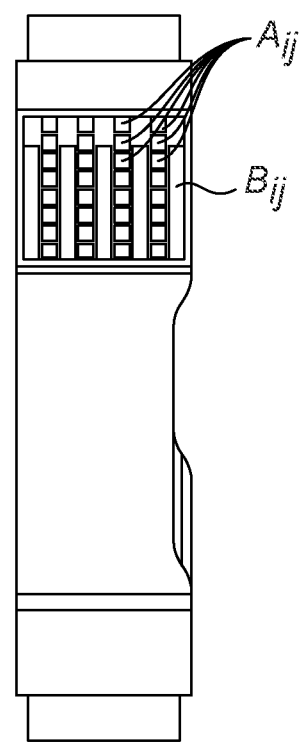
FIG. 7 is a cross-sectional view along line VII-VII in FIG. 6.

As shown in FIG. 7, respective end portion 30b, 30c presents a plurality of openings into the channels of one of the first respectively the second set of channels $A_{ij}$, $B_{ij}$ arranged in the line configuration achieved at the outer end 20b of the inner transition portion 20 and closed wall portions where the other set are diverted towards the other end portion 30c, 30b.

As mentioned above, the heat exchanger 1 further comprises four tubular connection portions 40. Each connection portion 40 have a tubular wall portion integrally formed with and extending from an outer envelope surface of respective one of the first and second end portions 30b, 30c of respective outer transition portions 30.

As shown in FIG. 2, the tubular connection portions 40 are circular. The integrally formed part of the connection portions 40 are adapted to receive or to be received into a separately manufactured circular cylindrical secondary connection portion. The secondary connection portion is provided with threads on its outer surface allowing a connecting pipe to be threaded onto or to be held tight against the tubular connection portion using the threads. Alternatively, the connection portions 40 integrally formed with the other parts 10, 20, 30 are provided with threads.

The inner transition portion 20 have a length in the main direction L being at least 3 times a maximum width W of any channel $A_{ij}$, $B_{ij}$ of the checkered pattern in the central body 10. It is considered appropriate if the inner transition portion 20 have a length less than 10 times the maximum width W. It is considered appropriate if each channel in the central body have a maximum width of less than 3 mm, preferably less than 2 mm. It is considered appropriate that the channels have a minimum width of at least 0.1 mm.

In the preferred embodiment shown in FIG. 1 and FIG. 2, the channels have a square cross-section with the sides of 0.5 mm to 2 mm. There are y channels along the first direction $T_1$ and along the second direction $T_2$. The wall thickness between the channels may be about 0.05 mm to 0.4 mm. The wall thickness between the outermost channels and the outer surface of the central body may be the same as for the wall thickness but is preferably thicker, such as about 0.5 mm to 2 mm. The inner transition portion have a length of b mm.

As indicated in FIG. 6, each channel $A_{ij}$, $B_{ij}$ in the central body 10 continuing through the inner transition portion 20 and continuing into the outer transition portion 30 continue through the outer transition portion 30 as a separate channel to respective first or second end portion 30b, 30c (in a checkered configuration in the central body 10, in a shifting configuration in the inner transition portion 20 and in a line configuration in the outer transition portion 30).

In FIG. 6, it is also indicated that in the outer transition portion 30, the channels of the first set of channels $A_{ij}$ and the second set of channels $B_{ij}$ being diverted to extend along a third direction $T_3$ respectively a fourth direction $T_4$ are curved from the direction (typically at least essentially parallel with the main direction and preferably parallel with the main direction) from which they exit the respective inner transition portion 20 to the third respectively the fourth directions $T_3$, $T_4$. In the embodiment in FIGS. 10 and 11, in the outer transition portion 30, the channels of the first set of channels $A_{ij}$ being diverted to extend along a third direction $T_3$ are curved from the direction (typically at least essentially parallel with the main direction and preferably parallel with the main direction) from which they exit the respective inner transition portion 20 to the third direction $T_3$. In the embodiment in FIGS. 10 and 11, in the outer transition portion 30, the channels of the second set of channels $B_{ij}$ are arranged in the same direction (typically at least essentially parallel with the main direction and preferably parallel with the main direction) as they exit the respective inner transition portion 20 to extend out of the outer transition portion 30 along the fourth direction $T_4$. In other words, the direction of the channels of the second set of channels $B_{ij}$ is unaffected through the outer transition portion 30. Thus, in the embodiments of FIGS. 10 and 11, the channels of the second set of channels $B_{ij}$ are straight through the outer transition portion 30.

The central body 10 and the inner transition portion 20, and preferably also the outer transition portion 30 and more preferably also the connection portions 40 are formed by, preferably integrally formed by, additive depositing of a material.

The material is a metallic material, preferably chosen from the group consisting of titanium or titanium based alloys, tantalum or tantalum based alloys, steel or steel based alloys, stainless steel or stainless steel based alloys.

The material is laser or electron sintered during the additive depositing of the metallic material, or sintered in an oven after the additive depositing.

Figure 9A:
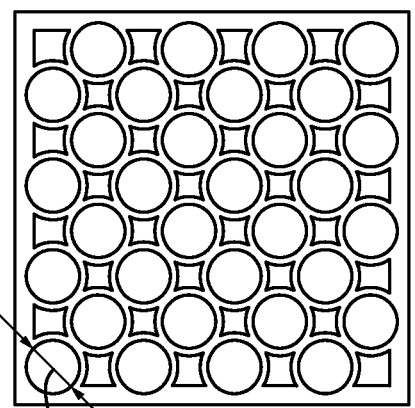
FIG. 9a is a schematic drawing corresponding to a cross-sectional view along line III-III in FIG. 2 of another embodiment.
Figure 9B:
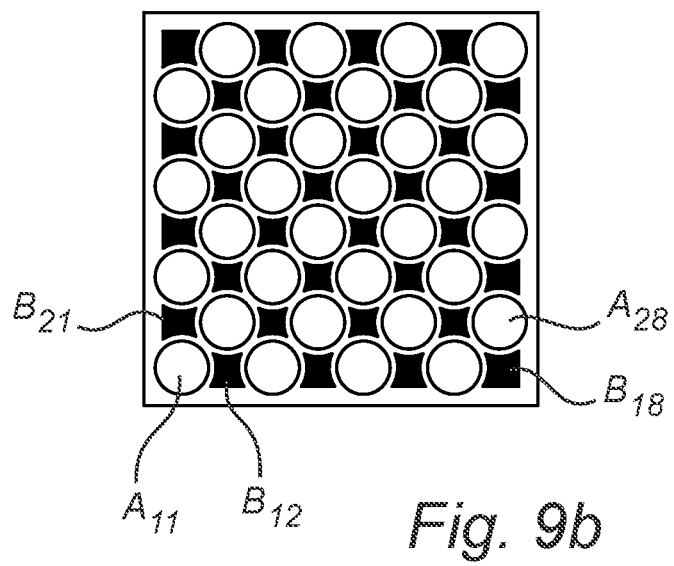
FIG. 9b corresponds to FIG. 9a in which the channels associated with one of the fluids is marked in dark solid marking.

In FIG. 9a and FIG. 9b, there is shown an alternative shape of the channels $A_{ij}$, $B_{ij}$. In this alternative configuration one set of the channels $A_{ij}$; is designed having circular cross-sections and being arranged in a checkered pattern with channels formed in the interspaces between neighbouring circular channels. In this configuration the circular channels have a greater cross-sectional area than the other channels.

Each of the channels of the first set of channels has a first cross-sectional area and each of the channels of the second set of channels has a second cross-sectional area, wherein the first cross-sectional area may be between 1.1-1.5 times, preferably between 1.1-1.25 times, the second cross-sectional area. This way it is possible to accommodate different flows of the different fluids through the heat exchanger.

It is contemplated that there are numerous modifications of the embodiments described herein, which are still within the scope of the invention as defined by the appended claims.

It may e.g. be noted that in accordance with one embodiment, the central body is manufactured separately as one entity and the inner and outer transition portions are manufactured as an integrally formed body being adapted to be attached to the central body. In this embodiment it is also preferred that the connection portions are integrally formed with the body comprising the inner and outer transition portions. The central body may e.g. be manufactured separately by an extrusion process.

It may be noted that the central body may be divided into a plurality of separate bodies arranged one after another along the main direction and/or arranged side by side along the first and/or the second transverse direction.

It may also be noted that the central body and/or the inner transition portions and/or the outer transition portions may be manufactured of a polymer based material.

It may also be noted that the central body and/or the inner transition portions and/or the outer transition portions may be manufactured of different materials.

The invention claimed is:

1. Heat exchanger comprising
a central body with
a first set of channels forming part of a first set of fluid pathways through the heat exchanger, and
a second set of channels forming part of a second set of fluid pathways through the heat exchanger,
the channels of the first and second sets extending from a first end of the central body, along a main direction through the central body, to a second end of the central body,
wherein, in the central body, in a cross-section across the main direction, the channels of the first and second sets form a checkered pattern by being arranged alternatingly in a plurality of rows along a first direction extending along a first portion of a perimeter of the pattern and alternatingly in a plurality of rows along a second direction extending transverse to the first direction and along a second portion of the perimeter of the pattern,
the heat exchanger further comprising two inner transition portions of which one extends from the first end of the central body and one extends from the second end of the central body,
the channels of the first and second sets extending from the ends of the central body, in the checkered pattern and into each of the inner transition portions at an inner end of respective inner transition portion, through the respective inner transition portion and to an outer end of the respective inner transition portion,
wherein, in the respective inner transition portion, every second row along the first direction is increasingly shifted in the first direction and relative every other second row of the rows, until the checkered pattern of the first and the second sets of channels at the inner end of the respective inner transition portion is transformed into a line pattern at the outer end of the respective inner transition portion, the channels of the respective set of channels thereby, at each outer end of the respective inner transition portion, being arranged alongside each other in rows that extend along the second direction, with the rows of the first set of channels and the rows of the second set of channels being arranged alternatingly along the first direction.

2. Heat exchanger according to claim 1, wherein, in the respective inner transition portion, among the rows extending along the first direction, are every other second, counted along the second direction, row provided with channels being, in a plurality of cross-sections, across the main direction, sequentially following each other along the main direction, increasingly shifted in position in a direction opposite the first direction.

3. Heat exchanger according to claim 1, wherein the inner transition portions are integrally formed with the central body.

4. Heat exchanger according to claim 1, further comprising two outer transition portions, one extending from either outer end of the respective inner transition portion, wherein each outer transition portion comprises a first set of channels forming part of the first set of fluid pathways and a second set of channels forming part of the second set of fluid pathways,
wherein the channels of the first and second sets extend from an inner end of the outer transition portion, facing the inner transition portion, through the outer transition portion and out of the outer transition portion,
wherein, in the outer transition portions, the first set of channels and/or the second set of channels are diverted to extend along a third direction respectively a fourth direction extending in parallel with a diversion plane defined by the main direction and the second direction and being transverse to said shift direction of the respective inner transition portion,
wherein the third and fourth directions are different from each other such that the first set of channels extend out of the outer transition portion at a first end portion and the second set of channels extend out of the outer transition portion at a second end portion, the second end portion being separated from the first end portion.

5. Heat exchanger according to claim 4, wherein the respective inner transition portion is integrally formed with the associated outer transition portion.

6. Heat exchanger according to claim 4, wherein the central body, the inner transition portions and the outer transition portions are integrally formed into a single body.

7. Heat exchanger according to claim 4, wherein the heat exchanger further comprising four tubular connection portions, each having a tubular wall portion integrally formed with and extending from an outer envelope surface of respective one of the first and second end portions of respective outer transition portions.

8. Heat exchanger according to claim 4, wherein each channel in the central body continuing through the inner transition portion and continuing into the outer transition portion continue through the outer transition portion as a separate channel to the respective first or second end portion.

9. Heat exchanger according to claim 4, wherein, in the outer transition portion, the channels of the first set of channels and/or the second set of channels being diverted to extend along a third direction respectively a fourth direction are curved from the direction from which they exit the respective inner portion to the third respectively the fourth direction.

10. Heat exchanger according to claim 4, wherein the central body, the inner transition portions and the outer transition portions are formed by additive depositing of a material forming the central body, the inner transition portions and the outer transition portions.

11. Heat exchanger according to claim 4, wherein the central body, the inner transition portions and the outer transition portions are integrally formed by additive depositing of a material forming the central body, the inner transition portions and the outer transition portions.

12. Heat exchanger according to claim 1, wherein the inner transition portion have a length in the main direction being at least 3 times a maximum width of any channel of the checkered pattern in the central body.

13. Heat exchanger according to claim 1, wherein each channel in the central body has a maximum width of less than 3 mm.

14. Heat exchanger according to claim 1, wherein the central body and the inner transition portions are formed by additive depositing of a material forming the central body and the inner transition portions.

15. Heat exchanger according to claim 14, wherein the material is a metallic material.

16. Heat exchanger according to claim 15, wherein the material is laser or electron sintered during the additive depositing of the metallic material, or sintered in an oven after the additive depositing.

17. Heat exchanger according to claim 14, wherein the material is a metallic material chosen from the group consisting of titanium or titanium based alloys, tantalum or tantalum based alloys, steel or steel based alloys, stainless steel or stainless steel based alloys.

18. Heat exchanger according to claim 1, wherein each of the channels of the first set of channels has a first cross-sectional area and each of the channels of the second set of channels has a second cross-sectional area, wherein the first cross-sectional area is between 1.1-1.5 times the second cross-sectional area.

19. Heat exchanger according to claim 1, wherein each channel in the central body has a maximum width of less than 2 mm.

20. Heat exchanger according to claim 1, wherein the central body and the inner transition portions are integrally formed by additive depositing of a material forming the central body and the inner transition portions.

* * * * *